(No Model.)
W. H. GOHRING.
TRUCK.
No. 460,470. Patented Sept. 29, 1891.
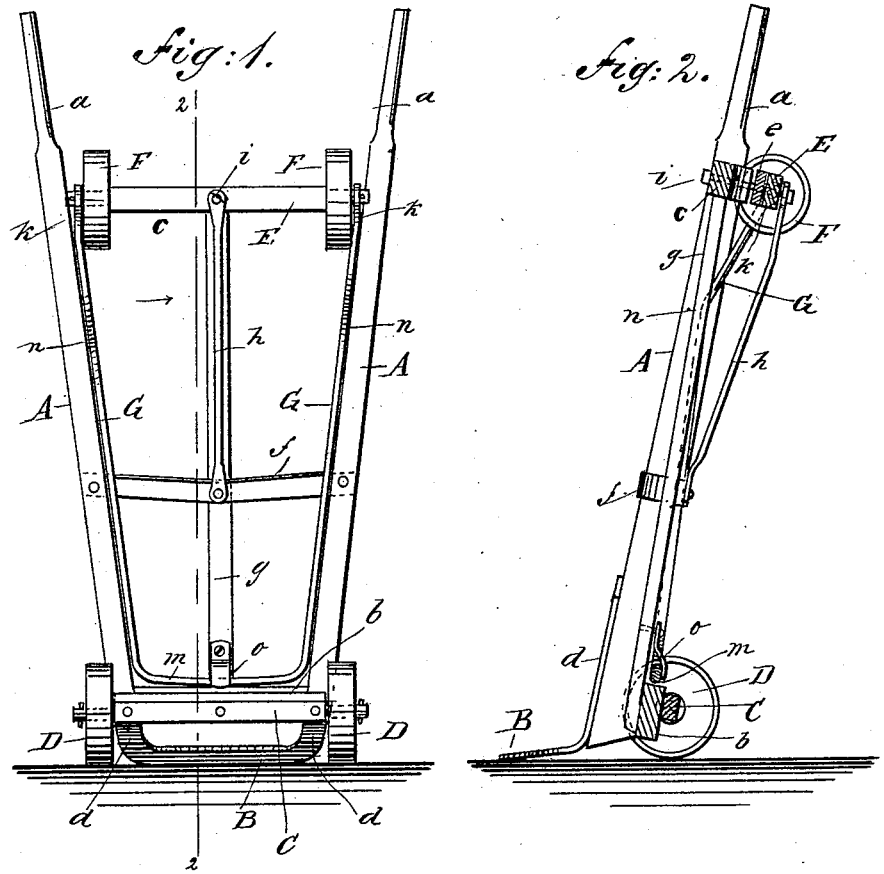
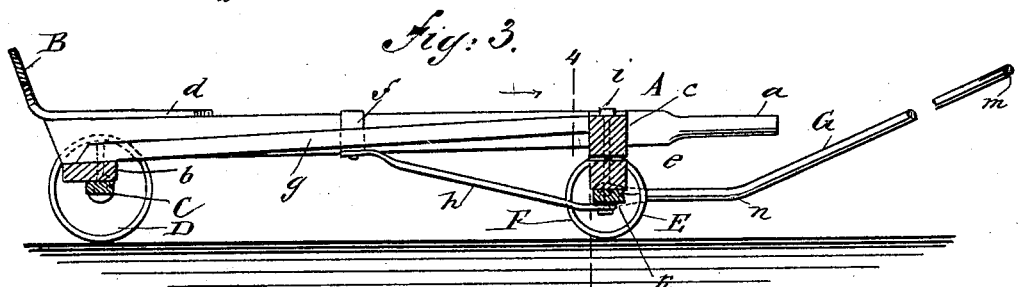
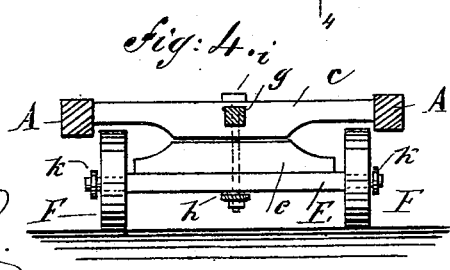
WITNESSES:
Chas. Nida
C. Sedgwick
INVENTOR:
W. H. Gohring
BY Munn & Co
ATTORNEYS

UNITED STATES PATENT OFFICE.

WILLIAM H. GOHRING, OF BINGHAMTON, NEW YORK, ASSIGNOR OF ONE-HALF TO NORMAN LUCE, OF SAME PLACE.

TRUCK.

SPECIFICATION forming part of Letters Patent No. 460,470, dated September 29, 1891.

Application filed December 16, 1890. Serial No. 374,883. (No model.)

*To all whom it may concern:*

Be it known that I, WILLIAM H. GOHRING, of Binghamton, in the county of Broome and State of New York, have invented a new and useful Truck, of which the following is a full, clear, and exact description.

This invention relates to an improvement in hand-trucks for the transportation by manual force of freight or baggage, and has for its objects to provide a device of the type indicated which will be adapted for use as a two-wheeled truck or as a four-wheeled vehicle, which may be drawn to any point for the discharge of a load.

To these ends my invention consists in certain features of construction and combinations of parts, as is hereinafter described and claimed.

Reference is to be had to the accompanying drawings, forming a portion of this specification, in which similar letters of reference indicate corresponding parts in all the views.

Figure 1 is a bottom view of the truck elevated. Fig. 2 is a longitudinal section taken on the line 2 2 in Fig. 1. Fig. 3 is a section on the line 2 2 in Fig. 1, with the parts differently adjusted from that shown in Fig. 2; and Fig. 4 is a transverse section on the line 4 4 in Fig. 3, viewed in the direction of the arrow in said figure.

The frame of the truck is of the usual form and is comprised of two similar side bars A, having rounded handles $a$ formed on one end of each. A cross-bar $c$ is secured between the side bars A near the handles $a$, which serve to hold said handles properly separated, and near the opposite ends of the side bars A, a transverse bar $b$ is affixed, preferably on their lower sides. The usual heel-plate B is furnished, which has two portions $d$ bent to lie upon the top edges of the side bars A, and are thereto secured by bolts or other means and serve to stiffen this end of the truck, and also aid in the loading of the same when it is operated in the ordinary way as a two-wheeled hand-truck. Upon the cross-bar $b$ an axle C is bolted, having its rounded ends projected as spindles for the revoluble engagement of similar wheels D, which are thereon mounted and retained from displacement by transverse linch-pins or other suitable device.

The cross-bar $c$ is cut away on the lower side to form a bolster-seat, whereon the bolster $e$ has contact, said bolster being mounted on and attached to the axle E, whereon the wheels F are loosely secured, the axle having spindles formed on its ends for the reception of said wheels, that are preferably made of an equal size with the other pair of wheels D.

At a point nearly central between the axles C and E a transverse brace $f$ is attached by its ends upon the side bars A and is bent downwardly near its middle to receive a longitudinal stay-piece $g$, the ends of which are secured to the cross-bars $b$ and $c$. Upon the lower side of the stay-piece $g$, where it engages the transverse brace $f$, one end of a reach-bar $h$ is firmly secured by a bolt that passes through the brace, stay-piece, and reach-bar, thus binding them all together. The other end of the reach-bar $h$ is perforated for the introduction of a king-bolt $i$, that is passed through the axle E, bolster $e$, and cross-bar $c$, said axle being adapted to swivel on the bolt as a fulcrum, and, as shown in Fig. 3, the reach-bar is suitably bent downwardly and toward the axle E to adapt it to afford support thereto by its engagement with the king-bolt, as stated.

Upon the ends of the spindles on the axle E, which project beyond the wheels F, the laterally-perforated ends $k$ of the looped handle G are loosely mounted and retained by cross-pins or other equivalent means. Said handle, being bent from a single rod of metal, extends forwardly to nearly reach the cross-bar $c$ and is provided with an integral cross-piece $m$, that serves as the grip-bar of the handle, whereby the entire device may be hauled.

At $n$ the side limbs of the handle G are bent to permit the portions of said limbs which are forward of said points to lie between the side bars A when the limbs are compressed toward each other, they having sufficient elasticity to allow such a compression, which, if effected when the handle is adjusted as represented in Fig. 1, will clamp the wheels F and prevent their rotation.

At the center of the grip-piece $m$ of the handle G a turn-button $o$ is caused to bear thereon when the handle is adjusted to clamp the wheels F, as stated, and the turn-button having one end pivoted upon the stay-piece *g* near the grip-piece *m* is thus adapted to swing upon its pivot and lock the parts together, which will prevent the axle E from swiveling on its king-bolt *i*, so that the wheels F are rendered stable to serve as supports in place of legs.

When a heavy load is to be transported, the handle G is loosened and swung outwardly in front of the axle E, as shown in Fig. 3, which will release the axle E and wheels F, thus converting the truck into a four-wheeled vehicle, whereon a comparatively heavy load may be piled and hauled by the handle G to any desired point.

Having thus described my invention, I claim as new and desire to secure by Letters Patent—

1. The combination, with a truck having its side bars extended to form handles, of a swiveled auxiliary axle near the handle end of the side bars, wheels on the axle, and a pivoted handle adapted to fold on the frame of the truck, substantially as described.

2. The combination, with a hand-truck, of auxiliary wheels near the handle end of the truck-frame, and a folding handle adapted to lock the said wheels from rotation when folded, substantially as described.

3. The combination, with a hand-truck, of an auxiliary axle swiveled to the truck-frame near the handle end thereof, wheels on the said axle, and a looped folding handle loosely mounted on the spindles of the axle and adapted to lock the wheels from rotation when folded, substantially as described.

4. The combination, with a hand-truck, of an auxiliary axle swiveled to the truck-frame near the handle end thereof, wheels on the said axle, a looped handle pivoted on the spindles of the axle and provided with bent portions adapted to lie between the side bars of the truck-frame when folded, and means for locking the handle in a folded position, substantially as herein shown and described.

WM. H. GOHRING.

Witnesses:
   GEO. L. CRANDAL,
   CHAS. E. TITCHENER.